United States Patent Office 2,820,696
Patented Jan. 21, 1958

2,820,696

STABILIZATION OF LIQUID SULFUR TRIOXIDE AND OLEUMS

Rudolph Pick, Elizabeth, N. J., assignor to E. I. du Pont de Nemours and Company, Wilmington, Del., a corporation of Delaware No Drawing. Application January 3, 1956
Serial No. 556,814

8 Claims. (Cl. 23—174)

This invention relates to liquid sulfur trioxide and high strength oleums that are stabilized against polymerization; and to the stabilization thereof employing a silicon halide as a polymerization inhibitor.

As is well known, sulfur trioxide exists in three forms having melting points of 17° C., 32.5° C., and 62° C. The polymeric form melting at 62° C., alpha $SO_3$, is the stable form under ordinary conditions. Upon freezing or even after standing at room temperature a short time the liquid gamma form (M. P. 17° C.) ordinarily changes to the solid forms.

This transition of liquid sulfur trioxide to solid polymeric forms is extremely undesirable from the standpoint of ease in handling and usage. In most instances, prior to usage the solidified sulfur trioxide must be remelted by heating to temperatures up to about 100° C., thereby developing dangerous high pressures in some instances.

High strength oleums of free sulfur trioxide strengths upward of about 80% tend to polymerize in a similar fashion. The degree of polymerization depends chiefly upon the sulfur trioxide strength of the oleum and the temperatures at which the material is stored. While polymerization will not proceed sufficiently far in some of these oleums to give a completely solid product, the degree of polymerization increases on the passage of time so that the ultimate mass will ordinarily contain solid forms of $SO_3$ in supension in the oleum. This polymerization of sulfur trioxide in high strength oleums is also highly undesirable.

I have discovered that liquid sulfur trioxide and oleum of $SO_3$ strength such that $SO_3$ polymers tend to form can be stabilized against $SO_3$ polymerization by incorporating therein a minor amount of one or more silicon halides, and then heating the product for several hours in the range of about 50° C.–100° C. The preferred heat treatment is for at least six hours at about 80° C.

The amount of inhibiting agent to be incorporated in the $SO_3$ or oleum will vary with the use for which the $SO_3$-containing product is intended and with the conditions it will be expected to meet. The stabilizing influence of these inhibiting agents is proportional to the amount present. In general, it usually is desirable to use only sufficient amount to stabilize the product against substantial polymerication of $SO_3$, although relatively larger amounts of inhibiting agents can be used where the presence of an excess is not objectionable. In most cases it is desirable to use no more than about 10% by weight of silicon halide, with from 0.2 to 5% based on the free $SO_3$ content being the preferred range. The higher percentages ordinarily are employed to stabilize the oleums.

The preferred compositions of this invention consist of liquid sulfur trioxide or oleum containing not more than about 0.1% of water, which materials contain from 0.2 to 5% by weight of the stabilizing agent. Oleum containing not more than about 0.1% of water is, of course, oleum of $SO_3$ strength not less than about 99.4% and sulfuric acid content of not more than 0.56%. These materials high in sulfur trioxide can be stabilized readily so as to resist polymerization even after storage for long periods of time.

The stabilizing agent can be added directly to the liquid sulfur trioxide or oleum to be stabilized followed by thorough agitation of the liquid. Alternatively, in the case of stabilizing pure liquid sulfur trioxide, $SO_3$ vapor can be condensed in a closed vessel containing the desired amount of stabilizing agent.

All silicon halides, that is the silicon tetrahalides and the disilicon hexahalides, such as silicon tetrafluoride, disilicon hexaiodide, silicon tetrabromide, disilicon hexachloride, silicon tetraiodide and the like are effective stabilizing agents in the practice of my invention. However, silicon tetrachloride is by far the most preferred stabilizing agent and by no means the equivalent of the above-mentioned silicon halides from the standpoint of ease of usage and properties of the stabilized $SO_3$ produced.

Materials stabilized in accordance with my method do not polymerize to any appreciable extent. They remain substantially in the liquid gamma form at room temperature. Furthermore, the stabilization inhibitor functions as an antifreeze, lowering the freezing point substantially in most instances. Even after freezing by being cooled to a low temperature, they remelt rapidly upon reheating to about 35° C. Therefore, these products can be used directly in commercial application without first putting them through a tedious remelting process.

In order that the invention can be better understood, the following examples in addition to those set forth above are given:

Example 1

One percent by weight of silicon tetrachloride is added with agitation to anhydrous liquid gamma sulfur trioxide. The liquid sulfur trioxide is then heated for 16 hours at 80° C. The thusly stabilized liquid sulfur trioxide remains liquid upon cooling to temperatures close to 0° C., indicating the definite antifreeze function of the stabilization inhibitor. Upon cooling the mixture to 0° C., it freezes; upon reheating to 35° C., the stabilized liquid sulfur trioxide remelts readily. After standing at room temperature for several days, the composition exhibits no noticeable polymerization.

Example 2

Three percent by weight of silicon tetrafluoride is added with agitation to anhydrous liquid gamma sulfur trioxide. The mixture is then heated at 60° C. for 24 hours. After standing at room temperature for 72 hours, the thusly stabilized liquid sulfur trioxide shows no tendency to polymerize and solidify.

Example 3

Five percent by weight of disilicon hexabromide is added with agitation to oleum of 99.5% $SO_3$ strength. The mixture is then heated at 70° C. for 8 hours. After freezing the thusly stabilized liquid sulfur trioxide by cooling to a low temperature, it is found to remelt readily upon reheating to about 35° C. After standing at room temperature for several days, the mixture shows no tendency to solidify.

Example 4

Three percent by weight of silicon tetraiodide is added with agitation to oleum of 99.7% $SO_3$ strength. The mixture is then heated for 8 hours at 60° C. Upon standing for several days at room temperature, the $SO_3$ composition remains liquid showing no tendency toward polymerization.

Other stabilized liquid gamma sulfur trioxide compositions can be prepared in accordance with the procedure of the above examples by substituting for the stabilizing agent of these examples an equivalent amount of disilicon hexachloride, disilicon hexafluoride, disilicon hexaiodide, or silicon tetrabromide.

I claim:

1. The method of stabilizing against $SO_3$ polymerization a compound selected from the group consisting of liquid sulfur trioxide and oleum of $SO_3$ strength such that $SO_3$ polymers tend to form comprising incorporating therein about 0.2 to 5% by weight based on $SO_3$ content of a binary silicon halide selected from a group consisting of silicon tetrahalides and disilicon hexahalides and then heating for several hours at a temperature in the range of 50° C. to 100° C.

2. The method of stabilizing liquid sulfur trioxide containing not more than 0.1% of water against $SO_3$ polymerization comprising incorporating therein about 0.2 to 5% by weight based on $SO_3$ content of a binary silicon halide selected from a group consisting of silicon tetrahalides and disilicon hexahalides.

3. The method of stabilizing liquid sulfur trioxide against $SO_3$ polymerization comprising incorporating therein about 0.2 to 5% by weight based on $SO_3$ content of a binary silicon halide selected from a group consisting of silicon tetrahalides and disilicon hexahalides.

4. A stabilized $SO_3$ composition comprising binary silicon halides selected from the group consisting of silicon tetrahalides and disilicon hexahalides, in an amount up to about 10% by weight based on the $SO_3$ content; and, in a concentration such that $SO_3$ polymers tend to form, a material selected from the group consisting of liquid sulfur trioxide and oleum.

5. A composition in accordance with claim 4 wherein said binary silicon halide is present in an amount of about 0.2 to 5% by weight of the $SO_3$ content.

6. A composition comprising liquid sulfur trioxide containing not more than about 0.1% of water and not more than 10% by weight based on $SO_3$ content of silicon tetrachloride.

7. The method of stabilizing against $SO_3$ polymerization the material selected from the group consisting of sulfur trioxide and oleum of $SO_3$ strength such that $SO_3$ polymers tend to form comprising incorporating therein a binary silicon halide selected from the group consisting of silicon tetrahalides and disilicon hexahalides in an amount up to 10% by weight based on $SO_3$ content.

8. The method of stabilizing against $SO_3$ polymerization the material selected from the group consisting of sulfur trioxide and oleum of $SO_3$ strength such that $SO_3$ polymers tend to form comprising incorporating therein a binary silicon halide selected from the group consisting of silicon tetrahalides and disilicon hexahalides in an amount up to 10% by weight based on $SO_3$ content and then heating the resulting composition for several hours at a temperature in the range of 50 to 100° C.

References Cited in the file of this patent

UNITED STATES PATENTS 2,716,593   Litant et al. _____ Aug. 30, 1955

FOREIGN PATENTS 669,214   Great Britain _____ Mar. 26, 1952

OTHER REFERENCES

Mellor: Vol. 6, "Comprehesive Treatise on Inorganic and Theoretical Chemistry," page 965, 2nd paragraph.